Patented Aug. 20, 1940

2,212,479

UNITED STATES PATENT OFFICE 2,212,479

TREATMENT OF PROTEINACEOUS SOLUTIONS

Franklin F. Ogden, Wollaston, Mass., assignor, by mesne assignments, to Monsanto Chemical Company, a corporation of Delaware No Drawing. Application September 9, 1937, Serial No. 163,055

8 Claims. (Cl. 134—12)

This invention relates to a new method for treating protein solutions or dispersions such as those containing casein, glue, albumen, and the like, whereby the protein is preserved against putrefaction and the viscosity of the solutions or dispersions may be increased to practically any desired extent. The difficulty experienced in preserving proteinaceous materials and the nature of the uses made of such materials renders this feature of particular value. Solutions such as these are well known and used in the adhesives, paper, plastics, paints, textiles, food, medicine, and other industries, and various applications of the invention will be readily seen.

An object of this invention is to provide a means for increasing the viscosity of the above mentioned solutions by a relatively inexpensive agent and in a manner that offers easy control of these viscosities.

A further object of this invention is to provide a means of maintaining a constant viscosity in a casein or other protein containing solution when a part of the protein is removed, or when it is desired to use less protein than in the original solution and yet maintain the same viscosity.

Another object of this invention is to provide a means for maintaining the viscosity of a protein containing solution when dilution brings the viscosity to an undesirable low value.

Other objects and applications of the invention will be readily seen by a study of the examples given in the specification.

It is well known that the addition of formaldehyde or certain salts of lead, copper, iron, magnesium, tin, etc., will thicken protein solutions such as those of casein and make them more viscous. These agents are also known to insolubilize the casein, which in some cases may be undesirable, particularly in solutions which must stand for some time before use. As an example of solutions or dispersions containing proteins may be mentioned "cold water" paints. These employ a casein base to give the proper consistency to the paint and to act as a binder for the pigment. The casein is caused to dissolve by means of various solvents such as borax, phosphates, and fluorides, with the employment of widely varying temperatures according to the properties desired in the casein solution. A paint using fluorides as casein solvents and carrying out the solution in the presence of finely divided silica may be made as follows: utilizing the directions of United States Patent 2,023,389 for dissolving the casein, add 150 parts of water, 14 parts of sodium fluoride, 5 parts of ammonium fluoride and 7 parts of pulverized silica to 100 parts of commercial acid precipitated casein. The mixture is heated to 190° F. and held there with slow stirring for periods of time varying from a few minutes to several hours, depending upon the type of product desired. One-half to one hour will generally give satisfactory results, during which time the casein melts to a viscous mass and loses its grainy characteristics. 300 parts of water at 120° F. are then added, and the mixture stirred until uniform. Approximately 2 parts of this casein solution are mixed with 3 parts of pigment of which a typical example would be a 50-50 mixture of lithopone and high grade talc. The resulting product is a stiff paste and is usually sold as such. For thinning to the proper consistency for use, the paste is usually diluted with about one-half of its volume of water. It is sometimes desired to increase the viscosity of this paste so that a larger amount of water will be required for dilution to the proper consistency for application. Small amounts of formaldehyde may be employed for this purpose, or certain soluble salts of lead, copper, magnesium, iron, tin, etc., which will not only thicken the solution but also render the casein insoluble in water. Both blood and egg albumen are similar in some respects to casein but they differ from it in that they lose their solubility if heated to about 75° C. Casein may be treated with boiling water and still be soluble when the correct proportions of alkali are added to it. Solutions of albumen may be prepared below 20° C. in a slightly ammoniacal aqueous solution. Other substances may be added to aid in solution such as borax, magnesium sulfate, etc. These solutions may be used in paper, leather, and other coating procedures in much the same way as casein is used, albumen having about the same adhesive strength. As in the case of casein, formaldehyde has a thickening effect on albumen solutions.

This invention comprises a novel method for increasing the viscosity of solutions or dispersions containing proteinaceous matter such as glue, casein, albumen, etc. by the addition of an organic agent belonging to that group of products classed as water soluble, aromatic sulfonic acid condensation products or their salts, many of which have leather tanning or bleaching properties and in acid condition are used for this purpose. More specifically, the invention utilizes a neutralized aryl sulfonic acid which has been condensed with a carbonyl compound. As an example of the sulfonic acid may be mentioned naphthalene sulfonic acid or its various alkyl derivatives such as monoamyl naphthalene sulfonic acid and as an example of the carbonyl compound may be mentioned formaldehyde, or the higher aldehydes and ketones which are capable of forming condensation products with naphthalene sulfonic acid or the aryl sulfonic acid employed. These condensation products are usually used as aqueous dispersions or solutions of their salts, although some are obtainable in the solid form. They may be formed by first sulfonating the aromatic constituent and then condensing, or the reverse procedure may be used in which the condensation is carried out first and then the resulting product sulfonated until soluble in water. In either case, the resulting products are neutralized with an alkaline reagent such as soda ash and utilized in the form of a salt of the sulfonic acid. Although it is preferable to employ a completely neutralized product, in some cases it may be desirable to have part of the sulfonic acid present as free acid, in which case the degree of acidity is easily controlled during the neutralization.

This invention permits an increase in the viscosity of the protein solutions but the completely neutral products will not materially affect the solubility of the protein when used in proportions such as are required by the invention, but as some slight decrease in water solubility of the proteins may be caused by certain large proportions or by certain special types of agents, this invention is not limited to those types or proportions which will have no effect on the protein's solubility.

The following is an example of the products suitable for use in this invention:

One kg. of naphthalene is heated for 40 minutes at 135° C. with 1.25 kg. of 93% $H_2SO_4$. This product is then poured into .6 kg. of water and cooled to 100° C. 0.47 kg. of 37% formaldehyde solution is run in uniformly over a 1½ hour period, the temperature being maintained at 100° C. during this time and for a period of 4½ hours after the formaldehyde has all been added. The solution is then made neutral by the addition of about 0.9 kg. of soda ash and diluted with water to a total weight of 9.35 kg. It has substantially no effect on the pH of solutions to which it is added, it is readily soluble in water and exerts very little effect on the surface tension of water. Naphthalene and formaldehyde are preferred as the aromatic and carbonyl compounds employed but this merely illustrates the type of agent suitable for this purpose and this invention is not limited to the specific reagents, amounts, times, or method described; other aromatics include methyl naphthalene, also phenols such as chlorophenol, cresols, etc. The sulfonation of the aromatic constituent may be carried out by any of the standard methods of sulfonation such as may be found in the literature, and the concentration of the reagents during the condensation may be varied within rather wide limits. It is preferable to pour the sulfonation product into between 0.4 and 0.8 kg. of water per kg. of naphthalene and then to carry on the condensation, but these amounts are not limitative. It is also preferable to use between 0.32 and 0.95 kg. of 37% formaldehyde per kg. of napthalene for condensation, but these limits may vary somewhat depending on the time of addition, type of sulfonic acid, and type of condensing agent. The neutralizing agent may be any alkaline reagent yielding a soluble salt of the sulfonic acid, such as soda ash, potassium carbonate, aqua ammonia, or certain organic compounds such as triethanolamine. The resulting products are well known in the tanning industry under the name of synthetic tans where they are used for bleaching, pretanning, and other operations and in the textile industry where certain of them are used as dye assistants.

Following is an illustration of the action of such an agent upon a protein solution: A 20% blood albumen solution as made up had a viscosity of 11 centipoises at 25° C. The addition of about 6% of an aqueous solution of a neutralized and condensed naphthalene sulfonic acid such as described above will raise the viscosity of the blood albumen solution to approximately 330 centipoises.

As a second example, this invention also finds application in casein paints. In the production of these paints there are many different methods of bringing the casein into solution by employing various solvents such as borax, phosphates, fluorides, etc. at widely varying temperatures. As these factors all have some effect on the character of the dissolved casein, and as many different percentages of casein to pigment, and casein to total weight are employed, the amount of thickening which will be caused by any certain amount of the organic condensation products of this invention cannot be specified except with regard to a definite example. The effect of the agents of this invention upon a casein paint in which the casein was brought into solution in accordance with the specific example of United States Patent 2,023,389 is hereby given. This patent employs sodium and ammonium fluoride for solution of the casein in the presence of finely divided silica. A casein-pigment-water paste is made up which in the usual practice is diluted with one-half its volume of water to bring it to the proper consistency for use. In this case it was found that the addition of about 3% (on the paste weight) of a neutral aqueous solution of the sodium salt of a naphthalene sulfonic acid condensation product such as described would so increase the viscosity of the paste that 6 pints of water were necessary for dilution of one gallon of the concentrated paste instead of the usual four pints of water. The addition of the agent may be made in the dilution water itself, or the agent may be incorporated in the paste at the time of manufacture. The latter method, which is perfectly safe, is preferred since no change in the viscosity of a so-treated paste will take place on storing except the usual changes always encountered in the storing of casein solutions.

It has been found possible to substitute the agents described in this invention for a part of the proteins in a protein solution such as the casein paint mentioned above, while maintaining the original viscosity, or in a solution of different concentration such as the following 10% casein plus 5% $TiO_2$ suspension. This solution was found to have a viscosity of about 125 centipoises. This same viscosity may be maintained by the following proportions of casein and an agent similar to that described (5% $TiO_2$ is present in all cases), 9.0% casein plus 1% agent, 8% casein plus 2% agent, 7.0% casein plus 2.1% agent and 6% casein plus 2.5% agent. The results would be slightly different without the $TiO_2$ present but the action of the agent would be essentially the same.

This invention is not limited to the examples here given as other proteins and agents other than the straight naphthalene sulfonic acid condensation product could be used, as for example, mono amyl naphthalene sulfonic acid. This was condensed in a manner similar to that given in the example with the product being diluted to the same final concentration of 9.35 kg. of final product per kg. of original monoamyl naphthalene. This product will exhibit the same general properties with the proteinaceous solutions of glue, albumen, casein, etc. and may be used in the same manner as the agent whose preparation was described in detail. To illustrate this, the following example is given.

The viscosity of a typical paper coating mixture, for instance one made up as described in the Technologic Paper of the Bureau of Standards No. 323, page 665, may be increased by the addition of the above aqueous solution of neutralized, condensed monoamyl naphthalene sulfonic acid. This paper coating mixture had the following composition: 100 parts mineral, 17.7 parts casein, 2.7 parts casein solvents, and 258 parts water. The original viscosity of this mixture was 22 centipoises at 25° C. The addition of 3% of the aqueous solution of the neutralized, condensed monoamyl naphthalene sulfonic acid raised the viscosity of the solution to 588 centipoises. It is of course possible to obtain any intermediate viscosity by the addition of the requisite intermediate amount of agent. Furthermore, the amount of casein contained in this paper coating may be reduced by as much as one-half and the viscosity maintained by the addition of the proper amount of agent. In the case of the naphthalene sulfonic acid condensation product, the addition of about 2.2% of the neutralized aqueous solution will maintain the original viscosity when the amount of casein used is halved.

By the method of this invention many other coating solutions, for instance, those used in leather finishing, may be raised in viscosity. A typical leather coating solution may be made up with the following proportions: 50 grams casein, 415 grams water, 5 grams concentrated aqua ammonia, 1.5 grams 37% formaldehyde. When used in actual coating, this stock solution is used in the concentration of about 5–50 grams per liter. The viscosity of the stock solution may be doubled by the addition of approximately one-half of one per cent of an aqueous neutralized solution of condensed naphthalene sulfonic acid similar to the one described.

As another example of the action of these agents on proteins, the addition of about four per cent of an aqueous neutral solution of a condensed naphthalene sulfonic acid raised the viscosity of a 20% glue solution by about 2000%.

The preservative effect of these compositions is evidenced by the results of tests which disclose that samples which normally deteriorate on exposure within two or three weeks are stable after more than a month of exposure.

Where the agents of the instant invention are described in the claims as having leather tanning properties it is understood that the properties, possessed by the aromatic syntans frequently employed by the leather tanning industry, especially as after-bleaches, are contemplated. Whether such materials actually convert any of the hide to leather is unknown to applicant but since the syntans are commonly described by those skilled in the art as having leather tanning properties, such terminology is here employed. Such syntans are preferably employed by the instant invention in the completely neutralized state but their leather tanning properties are referred to under pH conditions most favorable to tanning. Some authorities believe that the syntans are not tanning agents in the strict sense but, nevertheless, they precipitate proteinaceous materials, such as glue, from solution.

This invention may be subjected to many variations without departing from the spirit thereof so it is desired that it be limited only as defined by the appended claims.

What is claimed is:

1. A composition of matter having as its characterizing constituents an aqueous dispersion of a proteinaceous material and a water soluble, substantially neutral condensation product of an aromatic sulfonic acid and a carbonyl compound, said condensation product having leather tanning properties, the amount of said condensation product being such as to thicken the aqueous dispersion while otherwise maintaining the dispersed condition and to impart improved stability against putrefaction without impairing the solubility of the proteinaceous material.

2. A composition of matter having as its characterizing constituents an aqueous dispersion of a proteinaceous material and a water soluble, substantially neutral formaldehyde-naphthalene sulfonic acid condensation product having leather tanning properties, the amount of the latter being such as to thicken the aqueous dispersion while otherwise maintaining the dispersed condition and to impart improved stability against putrefaction without impairing the solubility of the proteinaceous material.

3. A composition of matter having as its characterizing constituents an aqueous dispersion of a proteinaceous material selected from the group consisting of casein, glue and albumen, and a water soluble, substantially neutral formaldehyde-aromatic sulfonic acid condensation product having leather tanning properties, the amount of the latter being such as to thicken the aqueous dispersion while otherwise maintaining the dispersed condition and to impart improved stability against putrefaction without impairing the solubility of the proteinaceous material.

4. The method of thickening a dispersion of a proteinaceous material while maintaining its dispersed condition and without impairing its solubility while at the same time imparting improved stability against putrefaction thereof comprising adding thereto a water soluble, substantially neutral formaldehyde-aromatic sulfonic acid condensation product having leather tanning properties.

5. The method of thickening a dispersion of a proteinaceous material while maintaining its dispersed condition and without impairing its solubility while at the same time imparting improved stability against putrefaction thereof comprising adding thereto a water soluble, substantially neutral formaldehyde-naphthalene sulfonic acid condensation product having leather tanning properties.

6. The method of thickening a dispersion of a proteinaceous material selected from the group consisting of casein, glue and albumen, while maintaining its dispersed condition and without impairing its solubility while at the same time imparting improved stability against putrefaction thereof comprising adding thereto a water soluble, substantially neutral formaldehyde-aromatic sulfonic acid condensation product having leather tanning properties.

7. A composition of matter having as its characterizing constituents an aqueous dispersion of casein and a water soluble substantially neutral salt of a formaldehyde-aromatic sulfonic acid condensation product having leather tanning properties, the amount of the latter being such as to thicken the aqueous dispersion while otherwise maintaining the dispersed condition and to impart improved stability against putrefaction without impairing the solubility of the proteinaceous material.

8. A composition of matter having as its characterizing constituents an aqueous dispersion of a proteinaceous material and a water soluble, substantially neutral salt of the condensation product of an aromatic sulfonic acid and a carbonyl compound, the amount of said salt being such as to thicken the aqueous dispersion while otherwise maintaining the dispersed condition and to impart improved stability against putrefaction without impairing the solubility of the proteinaceous material.

FRANKLIN F. OGDEN.